No. 669,884. Patented Mar. 12, 1901.
J. C. STODDARD.
IMPLEMENT FOR PARING AND PULPING FRUIT.
(Application filed Mar. 19, 1900.)

(No Model.)

Witnesses:
K. O. Clemons
T. L. Hitchcock

Inventor:
Joshua C. Stoddard
By Chapin
Atty

THE NORRIS PETERS CO., PHOTO-LITHO., WASHINGTON, D. C.

UNITED STATES PATENT OFFICE.

JOSHUA C. STODDARD, OF SPRINGFIELD, MASSACHUSETTS.

IMPLEMENT FOR PARING AND PULPING FRUIT.

SPECIFICATION forming part of Letters Patent No. 669,884, dated March 12, 1901.

Application filed March 19, 1900. Serial No. 9,157. (No model.)

*To all whom it may concern:*

Be it known that I, JOSHUA C. STODDARD, a citizen of the United States of America, residing at Springfield, in the county of Hampden and State of Massachusetts, have invented new and useful Improvements in Implements for Paring and Pulping Fruit, of which the following is a specification.

This invention relates to implements for preparing fruit for eating by paring and pulping the same, the object being to provide an improved implement of this class the blade of which has a spoon-like form having suitably-formed edges which adapt it to the above-named uses; and the invention consists in the peculiar construction of said implement, whereby it is adapted to said several uses, all as hereinafter fully described, and more particularly pointed out in the claim.

Figure 1:
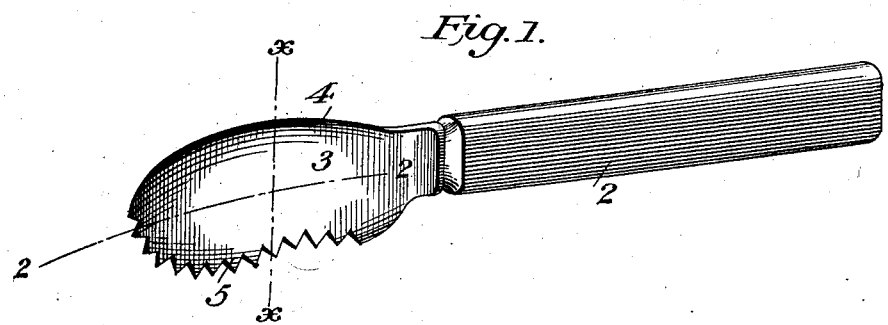
Figure 2:
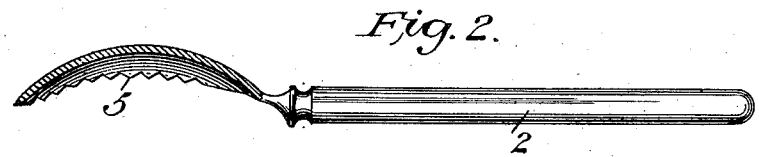
Figure 3:

In the drawings forming part of this specification, Figure 1 is a face view, somewhat in perspective, illustrating a fruit paring and pulping implement embodying my invention. Fig. 2 is an edge view of the implement, showing the blade thereof in longitudinal section on line 2 2, Fig. 1. Fig. 3 is a transverse sectional view of said blade about midway between its extremity and its junction with the handle thereof.

Referring to the drawings, 3 indicates the blade of the implement, which is preferably of steel and is provided with a suitable handle 2, to which it is firmly fixed. Said blade, which has a concavo-convex spoon shape, as shown, has one of its longitudinal borders 4, Fig. 1, sharpened, thereby producing a knife-edge, and its opposite border 5 is serrated. Thus said spoon shape of the blade provides a form thereof which facilitates its application to the rounded surface of fruit, whereby the said knife-edge is conveniently brought against the surface for removing the rind thereof. The serrated edge 5 of said spoon-shaped blade provides the means for pulping the fruit after removing the rind, as stated, by scraping. Thus the part of the fruit so scraped becomes pulped and is gathered into the bowl of the blade, and thereby is conveyed to the mouth to be eaten. Thus the article, while being substantially a spoon, is convertible at once into either a paring or a pulping implement, but still may be used as a spoon for the purpose stated.

Having thus described my invention, what I claim, and desire to secure by Letters Patent of the United States, is—

An implement for preparing fruit for eating, comprising a handle and a concavo-convex spoon-shaped blade having one of its longitudinal edges serrated, and the other sharpened, whereby the spoon may be made to serve as either a pulper or a parer, at will, substantially as described.

JOSHUA C. STODDARD.

Witnesses:
H. A. CHAPIN,
K. I. CLEMONS.